United States Patent
Simons et al.

(10) Patent No.: US 7,565,147 B2
(45) Date of Patent: Jul. 21, 2009

(54) SYSTEM AND METHOD FOR SYNCHRONIZING BASE STATIONS

(75) Inventors: Paul R. Simons, Redhill (GB); Martin S. Wilcox, Redhill (GB)

(73) Assignee: Koninklijke Philips Electronics N.V., Eindhoven (NL)

( * ) Notice: Subject to any disclaimer, the term of this patent is extended or adjusted under 35 U.S.C. 154(b) by 397 days.

(21) Appl. No.: 10/587,721

(22) PCT Filed: Jan. 25, 2005

(86) PCT No.: PCT/IB2005/050299

§ 371 (c)(1),
(2), (4) Date: Jul. 26, 2006

(87) PCT Pub. No.: WO2005/073751

PCT Pub. Date: Aug. 11, 2005

(65) Prior Publication Data

US 2007/0167169 A1    Jul. 19, 2007

(30) Foreign Application Priority Data

Jan. 27, 2004    (GB) ................. 0401767.9

(51) Int. Cl.
*H04W 4/00* (2006.01)
(52) U.S. Cl. .............. 455/446; 455/424; 455/456.2; 370/332; 342/357.1; 342/380; 342/437
(58) Field of Classification Search .............. 455/456.2, 455/446; 342/445, 437, 380, 357.1; 370/332
See application file for complete search history.

(56) References Cited

U.S. PATENT DOCUMENTS 5,640,678 A * 6/1997 Ishikawa et al. ............ 455/449

(Continued)

FOREIGN PATENT DOCUMENTS

EP    0 767 594    4/1997

(Continued)

OTHER PUBLICATIONS

Marilynn P. Wylie-Green & S. S. (Peter) Wang; "Observed Time Difference (OTD) Estimation for Mobile Positioning in IS-136 in the presence of BTS Clock drift", Oct. 7-11, 2001, IEEE Conference Proceeding, vol. 4, pp. 2677-2681.*

*Primary Examiner*—Lester Kincaid
*Assistant Examiner*—Isaak R Jama

(57) ABSTRACT

The invention provides a method for installing a positioning system, the positioning system comprising two or more base stations (BS1 to BS4), and comprises the steps of; collocating the base stations (BS1 to BS4); quantifying any lack of synchronization between the clocks of the base stations; relocating one or more of the base stations (BS2' to BS4') to their fixed, operational positions and measuring the time of flight of a signal from each of the relocated base stations; determining from the time of flight and quantified lack of synchronization data the relative separation of the base stations (BS1, BS2' to BS4') and hence the configuration of the installed positioning system, and recording the configuration of the installed positioning system. Data defining the configuration of the system can be relayed to a mobile transceiver in the vicinity of the installed positioning system and, along with time of flight measurements of signals emitted by the individual base stations, and data quantifying any real time lack of synchronization of the clocks of the base stations, can be used by the transceiver to position itself within the geographical area defined by the positioning system.

11 Claims, 2 Drawing Sheets

U.S. PATENT DOCUMENTS

Figure 1:
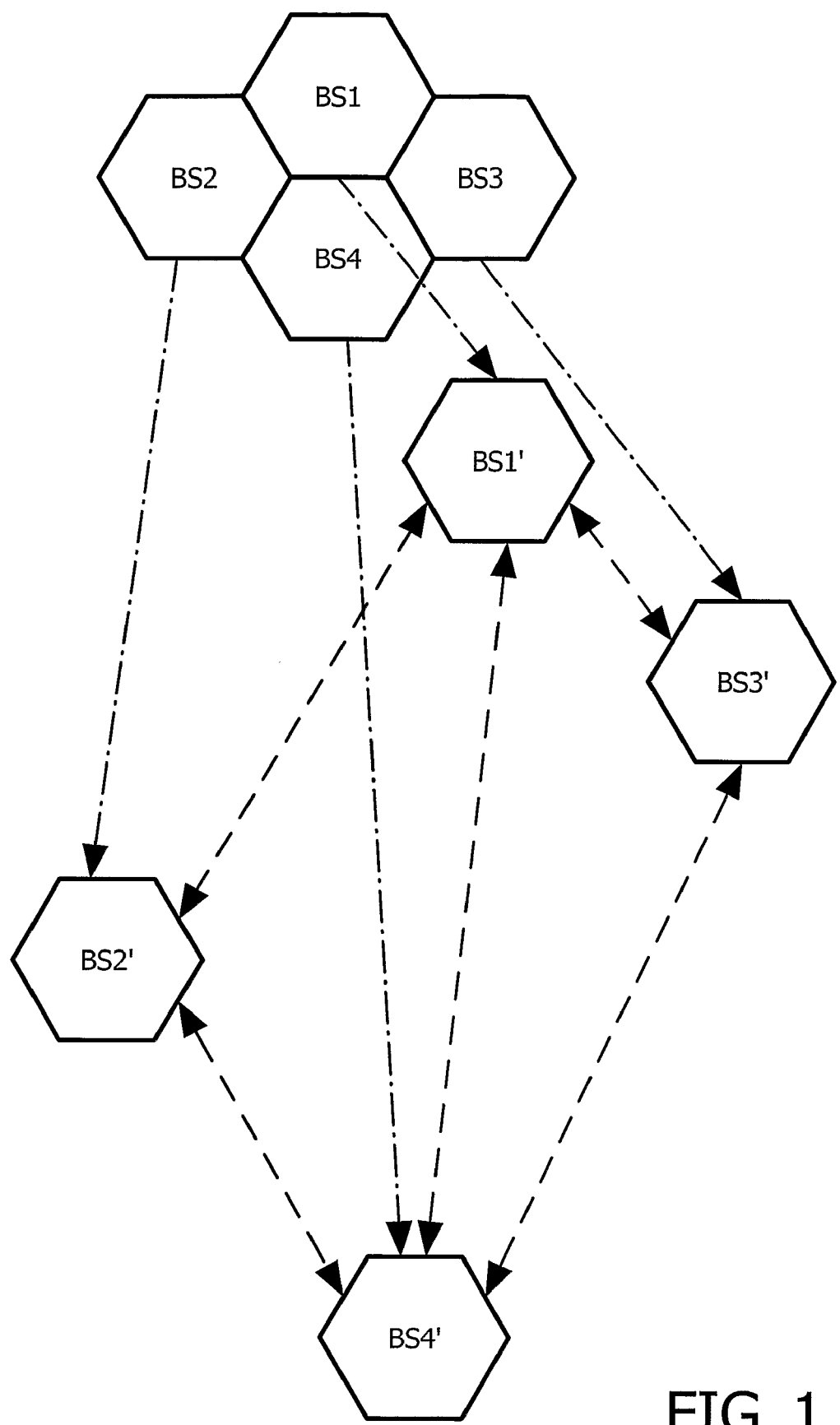

| | | | |
|---|---|---|---|
| 5,802,473 A * | 9/1998 | Rutledge et al. | 455/446 |
| 5,862,477 A * | 1/1999 | Wellard et al. | 455/423 |
| 6,108,553 A * | 8/2000 | Silventoinen et al. | 455/456.3 |
| 6,108,558 A | 8/2000 | Vanderspool, II et al. | |
| 6,185,429 B1 * | 2/2001 | Gehrke et al. | 455/502 |
| 6,246,883 B1 * | 6/2001 | Lee | 455/507 |
| 6,788,947 B2 * | 9/2004 | Becker et al. | 455/502 |
| 7,126,937 B2 * | 10/2006 | Crosbie et al. | 370/350 |
| 2002/0187749 A1 * | 12/2002 | Beasley et al. | 455/41 |
| 2006/0217120 A1 * | 9/2006 | Annunziato et al. | 455/446 |

FOREIGN PATENT DOCUMENTS

WO    WO 97/23785    7/1997

* cited by examiner

SYSTEM AND METHOD FOR SYNCHRONIZING BASE STATIONS

This invention relates to positioning systems and, in particular, to a method for installing a positioning system. The method has particular application for small positioning systems, for example within a home, office building or factory site, and which include two or more base stations whose clocks are not synchronised.

WO97/23785 discloses a location and tracking system for determining the position of a mobile radio frequency transceiver (such as a mobile telephone) in a wide geographical area about which a number of base stations are placed. The system, often referred to as an Enhanced-Observed Time Difference system (EOTD), includes a several base stations and a reference receiver (often termed a location measurement unit (LMU) in EOTD parlance), all located at known positions. The reference receiver is configured to compare the times of arrival of signals transmitted by the base stations and, knowing their position, determine the lack of synchronicity/clock offsets between the base stations. This offset data and the position of the base stations can then be transmitted to the mobile transceiver to enable the mobile transceiver to determine its position from subsequent unsynchronised base station transmission.

Installation of such systems inherently involves first determining the position of the reference receiver and the base stations. For example, each of the base stations and reference receiver could comprise a GPS receiver to enable them to determine their own position or a GPS receiver may have been collocated with the base stations and reference receiver during installation to determine their position. Whilst acceptable for large scale installation of wide geographical area positioning systems, the additional GPS receivers and/or installation method is unattractively complex if applied to the installation of small positioning systems in more local geographical areas such as (but not strictly limited to) offices, factory sites and homes.

The present invention aims to provide a positioning system and associated method which can be easily employed by individuals to install the positioning system in a local geographical area.

In accordance with a first aspect, the present invention provides a method for installing a positioning system, the positioning system comprising two or more base stations, the method comprising the steps of:
collocating the base stations,
quantifying any lack of synchronisation between the clocks of the base stations,
relocating one or more of the base stations to their fixed, operational positions and measuring the time of flight of a signal from each of the relocated base stations to at least one other base station,
determining from the time of flight and quantified lack of synchronisation data the relative separation of the base stations and hence the configuration of the installed positioning system, and
recording the configuration of the installed positioning system.

Ideally, the collocation occurs in a sufficiently small time period so as to render insignificant any drift in the or any of the individual clocks occurring during that period. However, if there is such clock drift, one might consider determining the rate of drift between base station clocks (and possibly high order derivatives) and adjust the measured time-of-flight accordingly.

Once the configuration of the positioning system is known and stored by one or more of the base stations, any mobile transceiver in the vicinity of the positioning system can position itself within the local geographical area serviced by the positioning system.

Optionally, after the quantifying step, and before the relocating step, the clocks of the base stations may be synchronised. In such a case, time of flight measurements subsequently taken to determine the relative separation of the relocated base stations will be representative of the distance between those base stations and not attributable to a lack of base station synchronicity.

In another aspect, the invention provides a positioning system comprising: a plurality of base stations; means for quantifying any lack of synchronisation between the clocks of the base stations when collocated; means for determining the relative separation of the base stations when relocated to their fixed, operational positions, and means for recording a configuration of the system defined by the relative separations of the base stations.

In respect of an EOTD type positioning system, the plurality of base stations may include a base station operable as an LMU. This, after locating the base stations in their fixed, operational positions and after internal clocks of the base stations have drifted, the LMU may continually monitor the relative lack of synchronicity of the clock of each of the base stations. The LMU may then broadcast the respective clock offsets and positions of the base stations so that when a mobile transceiver comes within the local geographical area serviced by the positioning system, it is able to determine its position.

Desirably, there are three or more base units, this allows a single position of a mobile transceiver to be calculated in a two dimensional plane. More desirably, there are five or more base units and preferably there are seven or more base units.

Ideally for portability, the base stations may be removably dockable to each other including indirectly via a carrier. Also, when docked, base stations can then be considered collocated. In this configuration, the fixed distance between the reference base station and the remaining docked base stations is known and the expected time of receipt of a signal from any docked base station by the reference base station is also known. By measuring differences between actual and expected times of receipt of signals from each docked base station with respect to the reference base station, the offset between each docked base station and the reference base station can be quantified. From this the relative offset between any pair of base stations can also be determined. It will be appreciated that the time of flight of a signal from any base station may be affected by a fixed delay in the electronic circuitry in the signal. As such delays are fixed, these can be predetermined and factored into any time of flight or clock offset measurement.

In respect of an EOTD type positioning system where one of the base stations is operable as an LMU, the remaining base stations are preferable removably dockable, directly to the base station operable as an LMU.

In another aspect, the invention provides a base station (BS0) configured to perform the method of: (i) determining any lack of synchronicity in the clocks of a plurality of base stations (BS1 to BS6) when collocated in a first position, and either (ii) after relocating one or more of the base stations, determining the relative position of the base stations from range measurements taken between the base stations after relocation and the lack of synchronicity determined in step (i), or (iii) after synchronisation the base stations and subsequently relocating of one or more of the base stations, determining the relative position of the base stations from range measurements taken between the base stations after relocation.

Figure 2:
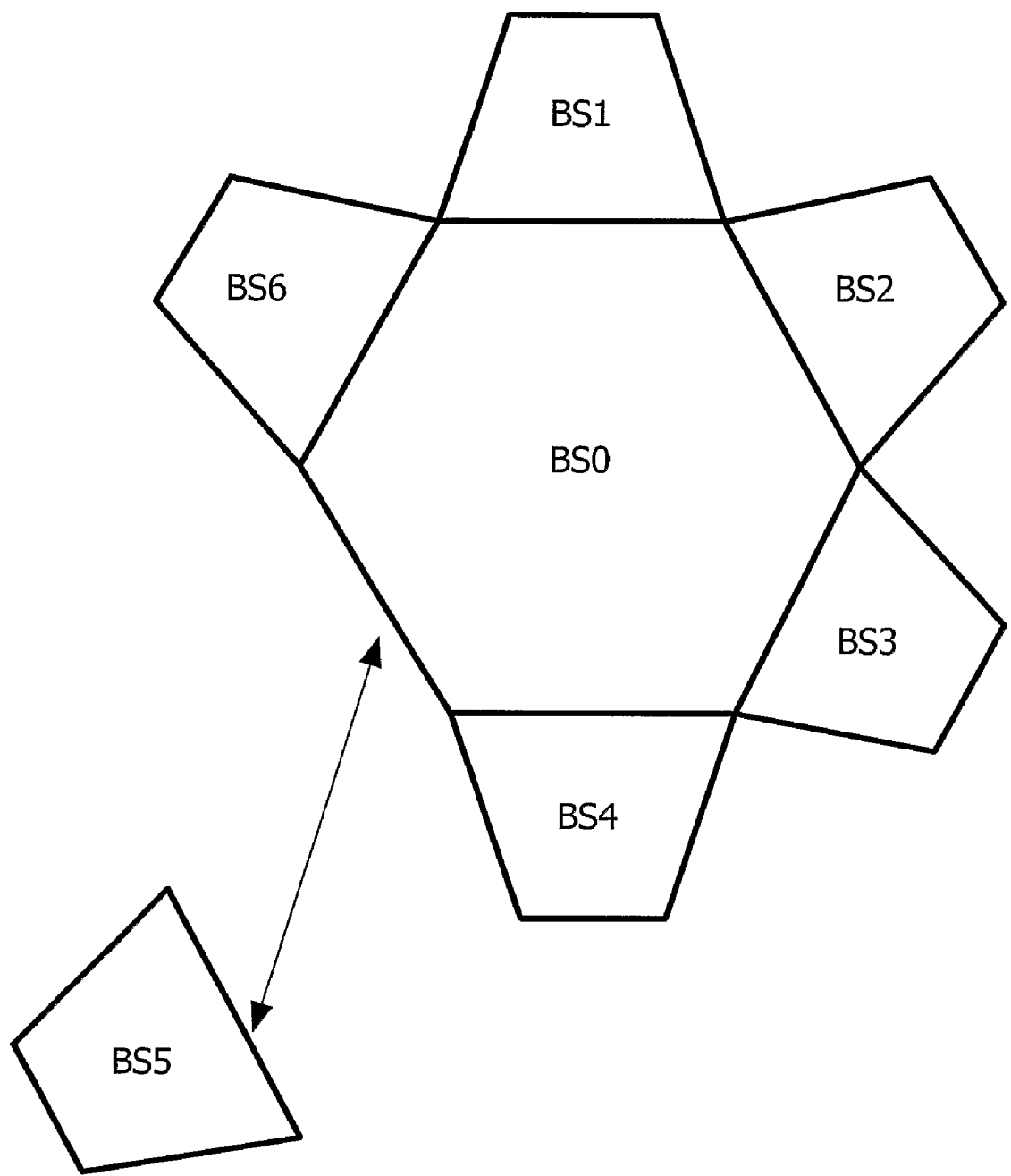

For the purposes of exemplification, some embodiments of the invention will now be further described with reference to the following figures in which;

FIG. 1 illustrates a method for installing a positioning system in accordance with the invention;

FIG. 2 illustrates an embodiment of a positioning system in accordance with the invention FIG. 1 illustrates 4 base stations BS1/BS1', BS2/BS2', BS3/BS3', BS4/BS4' of a positioning system. Each base station has an internal clock and is configured to emit a repeating signal with a regular period. Prior to positioning within a selected environment, the base stations are collocated together in one place as signified by BS1, BS2, BS3, BS4. Whilst collocated, the base stations quantify any lack of synchronicity between their respective clocks. At this point, the clocks of all the base stations may, optionally, be synchronised. With any lack of synchronicity quantified, the base stations are relocated to appropriate positions within a selected environment as signified by BS1', BS2', BS3', BS4' and the single headed arrows.

Immediately on deployment, providing base station clock drift during deployment is minimal, the base stations are able to calculate their relative positions with respect to each other in a two dimensional plane by resolving measured the time of flight between respective base stations (as represented by the double headed arrows) and the data on lack of synchronisation. However, as stated above, if there is such clock drift, the rate of drift between base station clocks (and possibly high order derivatives) may be determined and the measured time-of-flight adjusted accordingly.

A mobile transceiver (not shown) then entering the local geographical area receives signals from the unsynchronised base stations. The lack of synchronicity of the base stations can be calculated by one base station acting as a reference base station (or an LMU in E-OTD parlance). This reference station may then provide the mobile transceiver with the relative position of each base station and the lack of synchronicity from which it will be able to determine its position in the base station network using known E-OTD techniques.

FIG. 2 illustrates an embodiment of a positioning system in accordance with the invention. As can be seen, the positioning system comprises seven base stations BS0 to BS6, including a centre reference base station BS0 and six remaining base stations. In the figure, five of the remaining base stations BS1 to BS4 and BS6 are radially symmetrically docked about the reference base station BS0, the sixth, BS5 is shown detached from the reference base station BS0.

The system illustrated operates in four different modes, the modes activated sequentially. The first mode is a standby mode. This mode is the default mode when the base stations are docked together. This corresponds with the collocation step of the method of the present invention. BS0 is pre-programmed with data on the expected time of flight of a docked BS1 to BS6 inclusive of any fixed delays which may arise in the electronic circuitry of the system. Whilst in standby mode, times of flight of base stations BS1, BS2, BS3, BS4, BS5, and BS6 to BS0 are monitored. BS0 compares measured times of flight to the expected time of flight and calculates the difference. This difference provides a measure of the lack of synchronicity of the clock of any base station BS1 to BS6 compared to the clock of BS0.

When a user wishes to install the system, the individual base stations are disconnected and placed in an appropriate position within a selected environment. As an individual base station is disconnected from the docking station a record is made of the latest difference between the clock of the removed base station and the clock of base station BS0. Once the removed base station has been positioned within the environment, a second mode of operation is initiated, the installation mode. The switch to installation mode may be effected by the installer activating a switch on the positioned base station.

When in installation mode, a base station (BS1 to BS6) sends a signal to the base station BS0. The measured time of flight of the signal is adjusted to allow for any recorded lack of synchronicity of the clocks and from that data, a distance from base station BS0 to the positioned base station (BS1 to BS6) is calculated and stored by BS0. Once all base stations BS0 to BS6 have been separated and positioned in the environment, a further change in mode can be initiated, orientation mode. Again, the mode may be initiated by the installer activating a switch which may be on any one of the base stations, conveniently, BS0. Once BS0 has recorded distances to all the remaining, positioned base stations BS1 to BS6, the base stations BS1 to BS6 set about determining their positions relative to the others. This is explained in further detail below.

Let us assume, for a general case, there are N−1 displaceable base stations (for example BS1 to BS6) in a positioning system and reference base station (for example BS0) acting as a location measurement unit (LMU).

If the base stations are installed in a single plane (for example across a single floor or ceiling area in a building), then we can take $$C_2^N = \frac{N!}{(N-2)!2!} = \frac{N(N-1)}{2}$$

independent measurements between the N base stations. If we use the position of one of the base stations (for example the reference base station) as an origin, then 2(N−1) parameters are required to describe the relative positions of all the stations in a two dimensional plane. In order to be able to solve the relative positions and hence configuration of the installed positioning system in two dimensions, it is required that:

$$\frac{N(N-1)}{2} \geq 2(N-1)$$

so N must be greater than 4.

Thus, with five or more base stations, a mobile transceiver entering the geographical area serviced by the positioning system may take at least four time of flight measurements to at least four base stations enabling to solve for its three unknown position coordinates in three dimensional space and any lack of synchronicity between itself and the clock of the reference base station (or optionally an average of the clock time of all stations in the system). Hence, if the positioning system of the invention includes five or more base stations, it is able to install itself in a two dimensional plane without the need for an installer to carry out a manual step of measuring and recording the location of the positioned base stations. Also, a mobile transceiver entering the vicinity of the installed positioning system is able to position itself in three dimensional space.

Using similar principles, it can further be shown that, if the beacons are positioned across more than one plane, then 3(N−1) parameters are required to describe the relative positions of the base stations in three dimensional space, requiring at least seven base stations to resolve their relative positions in that space.

It is to be appreciated that the foregoing descriptions relates to just some example embodiments of the invention and is not intended to be restrictive on the true scope of the invention as defined by the appended claims. In particular, one the positioning system is deployment, a method other than E-OTD may be used to determine the position of mobile stations entering therein.

The invention claimed is:

1. A method for installing a positioning system, the positioning system comprising two or more base stations the method comprising the steps of:
    (a) prior to positioning the two or more base stations to their operational positions within a selected environment, symmetrically docking together said two or more base stations at a single symmetrically docketed position,
    (b) quantifying and recording clock offset information between each of said two or more docked base stations with respect to a center reference base station at said single docked position,
    (c) relocating one or more of the base stations from said single docketed position to their fixed, operational positions,
    (d) measuring the time of flight of a signal from each of the relocated base stations to at least one other base station,
    (e) determining, at said center reference base station from the recorded clock offset information time of flight and the quantified and recorded clock offset a relative separation of the base stations and hence the configuration of the installed positioning system,
    (f) recording at said center reference base station the configuration of the installed positioning system, and
    (g) storing the configuration data at each base station.

2. A method as claimed in claim 1 wherein after the quantifying step, and before the relocating step, the clocks of the base stations are synchronised.

3. A positioning system comprising: a plurality of base stations,
    means for symmetrically docking together said plurality of base stations at a single symmetrically docketed position,
    means for quantifying and recording by a center reference base station at said single docked position clock offset information between the respective clocks of the plurality of base stations with respect to the center reference base station,
    means for relocating one or more of the base stations from said single docketed position to their fixed, operational positions,
    means for measuring the time of flight of a signal from each of the relocated base stations to at least one other base station,
    means for determining, at said center reference base station, from the measured time of flight information and the clock offset information, a relative separation of the base stations and hence the configuration of the installed positioning system,
    means for recording at said center reference base station the configuration of the installed positioning system, and
    means for storing the configuration data at each base station.

4. A positioning system as claimed in claim 3 including a base station operable as a location measurement unit for E-OTD positioning.

5. A positioning system as claimed in claim 3 comprising 3 or more base stations.

6. A positioning system as claimed in claim 3 comprising 5 or more base stations.

7. A positioning system as claimed in claim 3 comprising 7 or more base stations.

8. A positioning system as claimed in claim 3 wherein the base stations are removably dockable to each other.

9. A positioning system as claimed in claim 8 wherein the remaining base stations are symmetrically, removably dockable about the reference base station.

10. A positioning system as claimed in claim 3 wherein the means for quantifying and means for recording are embodied in the reference base station.

11. A center base station configured to perform the method of:
    a) prior to positioning a plurality of base stations to their operational positions within a selected environment:
    b) quantifying and recording, at the center base station, clock offsets between a plurality of docked base stations relative to the center base station at a single docked position;
    c) one of
        (i) relocating one or more of the plurality of base stations. from the single docked position to their operational positions and measuring at the center base station, the time of flight signal from each of the relocated base stations to at least one other base station; or
        (ii) measuring at the center base station, the time of flight signal from each of the relocated base stations to at least one other base station and relocating one or more of the plurality of base stations, from the single docked position to their operational positions
    d) determining, at the center base station, from the quantified and recorded clock offsets and the measured time of flight signals, a relative separation of the base stations and hence a configuration of an installed positioning system; and
    e) recording at the center base station, the configuration of the installed positioning system.

* * * * *